United States Patent
Wang et al.

(10) Patent No.: US 10,917,916 B2
(45) Date of Patent: Feb. 9, 2021

(54) METHOD AND DEVICE FOR TRANSMITTING PRACH SIGNALS IN UNAUTHORIZED SPECTRUM

(71) Applicant: China Academy of Telecommunications Technology, Beijing (CN)

(72) Inventors: Jiaqing Wang, Beijing (CN); Xueming Pan, Beijing (CN); Qianqian Si, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 223 days.

(21) Appl. No.: 16/075,572

(22) PCT Filed: Jan. 3, 2017

(86) PCT No.: PCT/CN2017/000077
§ 371 (c)(1),
(2) Date: Aug. 3, 2018

(87) PCT Pub. No.: WO2017/133368
PCT Pub. Date: Aug. 10, 2017

(65) Prior Publication Data
US 2019/0053284 A1    Feb. 14, 2019

(30) Foreign Application Priority Data
Feb. 4, 2016    (CN) .......................... 2016 1 0081104

(51) Int. Cl.
*H04W 4/00* (2018.01)
*H04W 74/08* (2009.01)
(Continued)

(52) U.S. Cl.
CPC ....... *H04W 74/0833* (2013.01); *H04W 16/14* (2013.01); *H04W 72/0446* (2013.01); *H04W 74/08* (2013.01); *H04W 74/0808* (2013.01)

(58) Field of Classification Search
None
See application file for complete search history.

(56) References Cited

U.S. PATENT DOCUMENTS

| 2015/0003363 A1* | 1/2015 | Shi ..................... H04W 74/0833 370/329 |
| 2015/0305014 A1* | 10/2015 | Li ....................... H04W 72/048 370/330 |

(Continued)

FOREIGN PATENT DOCUMENTS

| CN | 101472345 A | 7/2009 |
| CN | 101771649 A | 7/2010 |

(Continued)

*Primary Examiner* — Phirin Sam
(74) *Attorney, Agent, or Firm* — Foley & Lardner LLP (57) ABSTRACT

Disclosed in the present application are a method and a device for transmitting PRACH signals in an unauthorized spectrum, used for enhancing channel access for a PRACH signal. The method comprises: before transmitting each candidate resource as configured in resources, a terminal performs LBT detection according to configuration information of a transmission resource for transmitting PRACH signals until a current channel is detected to be idle; and after detecting that the current channel is idle, the terminal transmits a PRACH signal on the corresponding candidate resource. In the present application, a plurality of candidate resources are configured in a transmission resource for transmitting PRACH signals, such that the terminal may transmit the PRACH signals on the corresponding candidate resource when it is detected that the current channel is idle (Continued)

before any candidate resource, thereby improving transmission probability for PRACH signals and enhancing channel access for PRACH signals.

20 Claims, 5 Drawing Sheets

(51) Int. Cl.
*H04W 16/14* (2009.01)
*H04W 72/04* (2009.01)

(56) References Cited

U.S. PATENT DOCUMENTS

| | | | |
|---|---|---|---|
| 2016/0150572 A1* | 5/2016 | Quan | H04L 1/1607 370/329 |
| 2016/0302076 A1* | 10/2016 | Chou | H04W 16/14 |
| 2017/0135128 A1* | 5/2017 | Yerramalli | H04W 74/0808 |
| 2017/0223635 A1* | 8/2017 | Dinan | H04W 52/367 |
| 2017/0311206 A1* | 10/2017 | Ryoo | H04W 88/02 |
| 2018/0351704 A1* | 12/2018 | Papasakellariou | H04L 5/0048 |
| 2019/0036756 A1* | 1/2019 | Yi | H04L 67/12 |
| 2019/0053284 A1* | 2/2019 | Wang | H04W 74/08 |

FOREIGN PATENT DOCUMENTS

| | | |
|---|---|---|
| CN | 104735729 A | 6/2015 |
| CN | 105101223 A | 11/2015 |
| WO | WO 2011120431 A1 | 10/2011 |
| WO | WO-2013/126858 A1 | 8/2013 |
| WO | WO-2015/141584 A1 | 9/2015 |
| WO | WO-2015/174748 A1 | 11/2015 |
| WO | WO-2017/166839 A1 | 10/2017 |

* cited by examiner

METHOD AND DEVICE FOR TRANSMITTING PRACH SIGNALS IN UNAUTHORIZED SPECTRUM

This application is a National Stage of International Application No. PCT/CN2017/000077, filed Jan. 3, 2017, which claims the benefit of Chinese Patent Application No. 201610081104.9, filed with the Chinese Patent Office on Feb. 4, 2016, and entitled "A method and device for transmitting a PRACH signal in an unauthorized spectrum", both of which are hereby incorporated by reference in their entireties.

FIELD

The present invention relates to the field of communications, and particularly to a method and device for transmitting a Physical Random Access Channel (PRACH) signal in an unauthorized spectrum.

BACKGROUND

As there is a constantly growing amount of mobile data traffic, spectrum resources become increasingly insufficient, and a demand for the amount of traffic may have not been satisfied by deploying a network and transmitting traffic only over licensed spectrum resources. In view of this, transmission may be deployed over spectrum resources in a Long Term Evolution (LTE) system (which is referred to Unlicensed LTE, or simply U-LTE or LTE-U) to thereby improve the experience of a user, and extend a coverage area. Unauthorized spectrum resources have not been planned for any particular application system, and thus may be shared by various wireless communication systems. e.g., Bluetooth, Wireless Fidelity (WiFi), etc., where the various systems access the unauthorized spectrum resources by preempting the resources, so ongoing researches are focused on the coexistence between LTE-U systems deployed by different operators, and between their LTE-U systems, and the WiFi and other wireless communication systems.

In order to guarantee fair accesses of various wireless communication systems in an unauthorized spectrum to the spectrum, wireless communication devices shall access the unauthorized spectrum in compliance with specific regulations and rules in some region, and for example, such a Listen Before Talk (LBT) rule is specified by the European Telecommunications Standards Institute (ETSI) that before a device accesses a channel, it firstly listens to the channel, and determines whether it is idle or available, and if the channel is available, then it may transmit data in the unauthorized spectrum, but the channel can only be occupied for a limited period of time. After the channel has been occupied for the limited period of time, the occupied spectrum resource shall be released, so that the resource can be preempted by another system.

Figure 1:
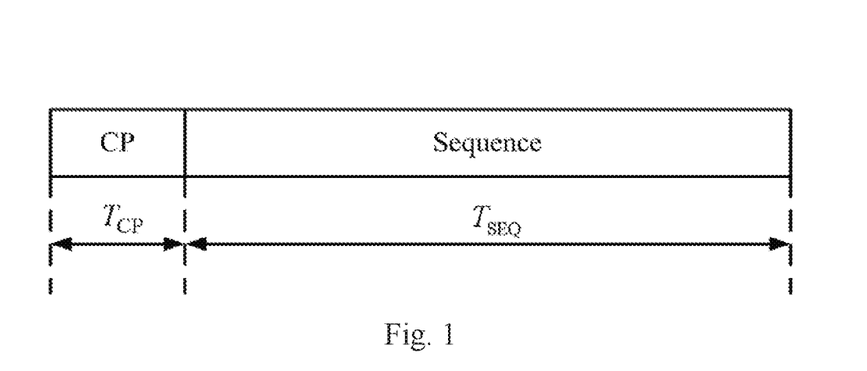
FIG. 1 is a schematic structural diagram of a PRACH signal.

In the LTE system, a terminal can transmit in the uplink only after it is synchronized with a base station for their uplink transmission instance of time. The terminal is synchronized in the uplink in a licensed spectrum by transmitting a PRACH signal to the base station. FIG. 1 illustrates a general structure of the PRACH signal (i.e., a preamble), where the Cyclic Prefix (CP) is primarily configured to enable a receiver to detect in the frequency domain, and the sequence is a Zadoff-Chu sequence of cyclic shifting. Since uplink synchronization has not been set up yet while the PRACH signal is being transmitted, a Guard Time (GT) shall be reserved after the PRACH signal to thereby avoid interference to another terminal.

Five structures of a PRACH signal (i.e., a preamble) are defined in the LTE system, and the respective structures are different in length in the time domain, but occupy six Physical Resource Blocks (PRBs), i.e., 72 sub-carriers. Table 1 depicts other parameters (the Ts is an elementary time unit in the LTE system in the table, where $Ts=1/30.72$ µs).

TABLE 1

| Preamble format | Length of time | $T_{CP}$ | $T_{SEQ}$ | Length of sequence | GT |
| --- | --- | --- | --- | --- | --- |
| 0 | 1 ms | $3152 \times T_s$ | $24576 \times T_s$ | 839 | ≈97.4 µs |
| 1 | 2 ms | $21012 \times T_s$ | $24576 \times T_s$ | 839 | ≈516 µs |
| 2 | 2 ms | $6224 \times T_s$ | $2 \times 24576 \times T_s$ | 839 | ≈197.4 µs |
| 3 | 3 ms | $21012 \times T_s$ | $2 \times 24576 \times T_s$ | 839 | ≈716 µs |
| 4 | ≈157.3 µs | $448 \times T_s$ | $4096 \times T_s$ | 139 | ≈9.375 µs |

Here the preamble format 4 can only be transmitted in an Uplink Pilot Time Slot (UpPTS) in the frame structure 2.

Since the LTE-U system needs to support a non-co-station scenario where a licensed spectrum is a primary carrier, and an unauthorized spectrum is a secondary carrier, uplink synchronization between a terminal and a base station shall be set up in the unauthorized spectrum, so the terminal needs to transmit a PRACH signal in the unauthorized spectrum. In order to design friendly coexistence between the LTE-U system and the WIFI system, it is required in the $3^{rd}$ Generation Partnership Project (3GPP) LTE-U standardization process that a wireless communication device shall perform LBT detection before it transmits a signal in an unauthorized spectrum, so the terminal shall firstly perform LBT detection before it transmits a PRACH signal in the unauthorized spectrum.

Since the terminal to transmit a PRACH signal in the unauthorized spectrum shall firstly perform LBT detection, if the current channel has been occupied before a PRACH signal is transmitted, the terminal cannot transmit any PRACH signal over the current channel, so uplink synchronization cannot be set up between the terminal and the base station, and even if the channel is subsequently idle, then the base station cannot schedule the terminal to transmit in the uplink in the unauthorized spectrum. Accordingly it is highly desirable to improve an access to a channel for a PRACH signal during uplink transmission in an unauthorized spectrum.

SUMMARY

Embodiments of the invention provide a method and device for transmitting a PRACH signal in an unauthorized spectrum so as to improve an access to a channel for a PRACH signal.

In a first aspect, there is a method for transmitting a PRACH signal in an unauthorized spectrum, the method including:

performing, by a terminal, LBT detection before each candidate resource configured in a transmission resource for transmitting a PRACH signal, according to configuration information of the transmission resource until a current channel being idle is detected; and transmitting, by the terminal, a PRACH signal over a corresponding candidate resource after the current channel being idle is detected.

Optionally, the configuration information is agreed on in advance between the terminal and a base station; or the configuration information is determined by the base station, and then signaled to the terminal.

Optionally, the configuration information includes at least one of positional information of the candidate resources in the transmission resource, a quantity of candidate resources in the transmission resource, or positional information of LBT periodicities for performing LBT detection before the candidate resources in the transmission resource.

Optionally, if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

Optionally, if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

In a second aspect, there is a method for receiving a PRACH signal in an unauthorized spectrum, the method including:

detecting, by a base station, a PRACH signal over each candidate resource configured in a transmission resource for transmitting a PRACH signal, according to configuration information of the transmission resource; and receiving, by the base station a PRACH signal transmitted by a terminal over any one candidate resource.

Optionally, the configuration information is agreed on in advance between the terminal and a base station; or the configuration information is determined by the base station, and then signaled to the terminal.

Optionally, the configuration information includes at least one of positional information of the candidate resources in the transmission resource, a quantity of candidate resources in the transmission resource, or positional information of LBT periodicities for performing LBT detection before the candidate resources in the transmission resource.

Optionally, if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

Optionally, if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

In a third aspect, there is a terminal including:

a channel detecting module configured to perform LBT detection before each candidate resource configured in a transmission resource for transmitting a PRACH signal, according to configuration information of the transmission resource until a current channel being idle is detected; and a signal transmitting module configured to transmit a PRACH signal over a corresponding candidate resource after the current channel being idle is detected.

Optionally, the configuration information is agreed on in advance between the terminal and a base station; or the configuration information is determined by the base station, and then signaled to the terminal.

Optionally, the configuration information includes at least one of positional information of the candidate resources in the transmission resource, a quantity of candidate resources in the transmission resource, or positional information of LBT periodicities for performing LBT detection before the candidate resources in the transmission resource.

Optionally, if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

Optionally, if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

In a fourth aspect, there is a base station including:

a channel detecting module configured to detect a PRACH signal over each candidate resource configured in a transmission resource for transmitting a PRACH signal, according to configuration information of the transmission resource; and a signal receiving module configured to receive a PRACH signal transmitted by a terminal over any one candidate resource.

Optionally, the configuration information is agreed on in advance between the terminal and a base station; or the configuration information is determined by the base station, and then signaled to the terminal.

Optionally, the configuration information includes at least one of positional information of the candidate resources in the transmission resource, a quantity of candidate resources in the transmission resource, or positional information of LBT periodicities for performing LBT detection before the candidate resources in the transmission resource.

Optionally, if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

Optionally, if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

In a fifth aspect, there is a terminal including: a transceiver, and at least one processor connected with the transceiver, wherein:

the processor is configured to read and execute program in a memory to:

perform LBT detection before each candidate resource configured in a transmission resource for transmitting a PRACH signal, according to configuration information of the transmission resource until a current channel being idle is detected; and to control the transceiver to transmit a PRACH signal over a corresponding candidate resource after the current channel being idle is detected; and the transceiver is configured to receive and transmit data under the control of the processor.

Optionally, the configuration information is agreed on in advance between the terminal and a base station; or the configuration information is determined by the base station, and then signaled to the terminal.

Optionally, the configuration information includes at least one of positional information of the candidate resources in the transmission resource, a quantity of candidate resources in the transmission resource, or positional information of LBT periodicities for performing LBT detection before the candidate resources in the transmission resource.

Optionally, if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

Optionally, if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

In a sixth aspect, there is a base station including: a transceiver, and at least one processor connected with the transceiver, wherein:

the processor is configured to read and execute program in a memory to:

detect a PRACH signal over each candidate resource configured in a transmission resource for transmitting a PRACH signal, according to configuration information of the transmission resource; and to control the transceiver to receive a PRACH signal transmitted by a terminal over any one candidate resource; and the transceiver is configured to receive and transmit data under the control of the processor.

Optionally, the configuration information is agreed on in advance between the terminal and a base station; or the configuration information is determined by the base station, and then signaled to the terminal.

Optionally, the configuration information includes at least one of positional information of the candidate resources in the transmission resource, a quantity of candidate resources in the transmission resource, or positional information of LBT periodicities for performing LBT detection before the candidate resources in the transmission resource.

Optionally, if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

Optionally, if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

In the embodiments of the invention, a plurality of candidate resources are configured in a transmission resource for transmitting a PRACH signal so that the terminal can transmit a PRACH signal over a corresponding candidate resource upon detecting the current channel being idle, before any one candidate resource, thus improving the probability of transmitting a PRACH signal, and an access to a channel for a PRACH signal.

DETAILED DESCRIPTION OF THE EMBODIMENTS

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those skilled in the art without any inventive effort shall fall into the scope of the invention.

The embodiments of the invention will be described below in further details with reference to the drawings. It shall be appreciated that the embodiments to be described are merely intended to illustrate and explain the invention, but not to limit the invention thereto.

Figure 2:
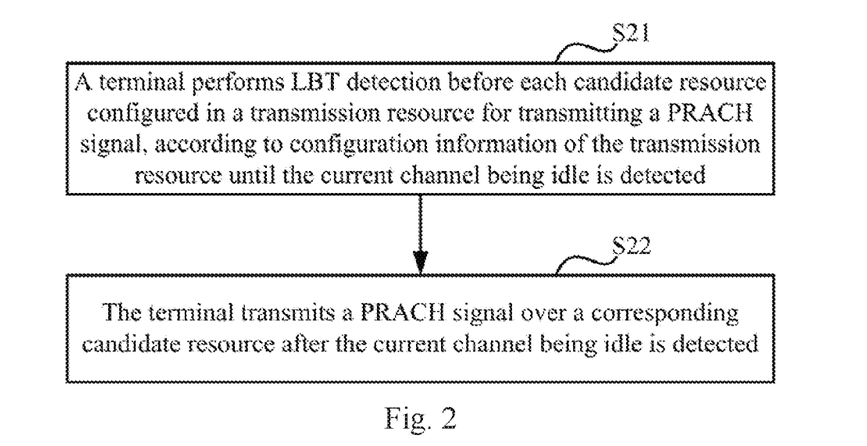
FIG. 2 is a schematic flow chart of a method for transmitting a PRACH signal in an unauthorized spectrum according to an embodiment of the invention.

A first embodiment of the invention provides a method for transmitting a PRACH signal in an unauthorized spectrum, and as illustrated in FIG. 2, the method includes following.

S21. A terminal performs LBT detection before each candidate resource configured in a transmission resource for transmitting a PRACH signal, according to configuration information of the transmission resource until the current channel being idle is detected.

Here at least two candidate resources are configured in the transmission resource.

S22. The terminal transmits a PRACH signal over a corresponding candidate resource after the current channel being idle is detected.

Particularly if the terminal detects the current channel being idle, before a first candidate resource, then the terminal will transmit a PRACH signal over the first candidate resource; if the terminal detects the current channel being idle, before a second candidate resource, then the terminal will transmit a PRACH signal over the second candidate resource; and so on.

In the embodiment of the invention, a plurality of candidate resources are configured in a transmission resource for transmitting a PRACH signal so that the terminal can transmit a PRACH signal over a corresponding candidate resource upon detecting the current channel being idle, before any one candidate resource, thus improving the probability of transmitting a PRACH signal, and an access to a channel for a PRACH signal.

In the embodiment of the invention, after the terminal detects the current channel being idle, before any one candidate resource, and transmits a PRACH signal over the corresponding candidate resource, the terminal can stop LBT detection from being performed before a subsequent candidate resource, and a PRACH signal from being transmitted over the candidate resource; or can further perform LBT detection before a subsequent candidate resource, and further transmit a PRACH signal over the corresponding candidate resource upon detecting the current channel being idle.

In the embodiment of the invention, the configuration information of the transmission resource includes at least one of positional information of the candidate resources in the transmission resource, a quantity of candidate resources in the transmission resource, or positional information of LBT periodicities for performing LBT detection before the candidate resources in the transmission resource.

In the embodiment of the invention, the configuration information of the transmission resource can be agreed on in advance between the terminal and a base station; or the configuration information can be determined by the base station, and then signaled to the terminal, as long as the terminal and the base station have the same understanding of the configuration information.

In the embodiment of the invention, a GT supported distance is twice the radius of a coverage area of a cell, so the PRACH formats 0 and 4 which are short in the time domain support coverage areas of approximately 14 km and 1.4 km respectively, and a PRACH signal in the format 4 is preferably applicable to a small cell in an unauthorized spectrum for which a coverage area over a short distance is required; and reference can be made to Table 1 for particular parameters thereof, so a repeated description thereof will be omitted here. Of course, a PRACH signal in another format will also be applicable to the embodiment of the invention.

In the embodiment of the invention, a quantity of candidate resources configured in the transmission resource is particularly determined by the magnitude of a PRACH signal to be transmitted over a candidate resource, and possibly by the length of an LBT periodicity for performing LBT detection before a candidate resource.

In the embodiment of the invention, the size of the transmission resource can include the following three optional implementation.

In an implementation A, the size of the transmission resource is a full sub-frame, and for example, and for example, the base station allocates for the terminal an uplink sub-frame for transmitting a PRACH signal.

In this implementation, the position of a candidate resource in the transmission resource include the following three optional implementation.

In an implementation A1, the start position of the first candidate resource in the transmission resource is located on the boundary position of the transmission resource, that is, the start position of the first candidate resource in the transmission resource is located on the start position of the transmission resource.

In this implementation, LBT detection before the first candidate resource in the transmission resource is configured in a preceding sub-frame of the transmission resource, that is, LBT detection is performed in the preceding sub-frame of the transmission resource.

Figure 3A:
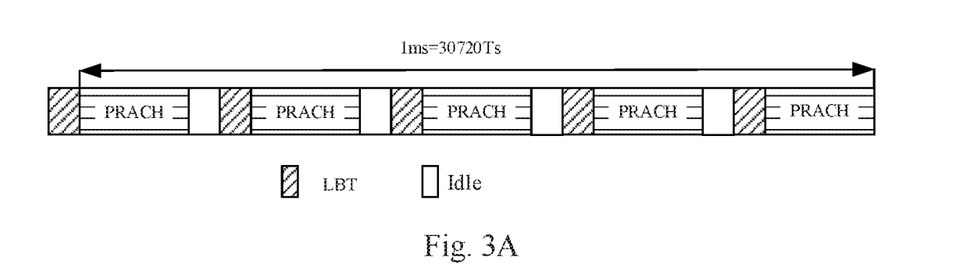
FIG. 3A is a first schematic diagram of configured transmission resources according to an embodiment of the invention.

By way of an example, taking a PRACH signal in the format 4 as an example, a PRACH signal is approximately 157.3 µs=4832×Ts, and as per the current 3GPP standard, an LBT periodicity for performing LBT detection of single Clear Channel Assessment (CCA) is at least 25 µs=768×Ts, so at most five candidate resources can be placed in 1 ms. If the base station does not schedule Downlink (DL) or Uplink (UL) transmission before the transmission resource, then the first candidate resource may be configured on the boundary position of the transmission resource, and an LBT periodicity before the first candidate resource may be configured in a preceding sub-frame of the transmission resource, that is, the terminal may perform LBT detection before the boundary position of the transmission resource. As illustrated in FIG. 3A, the LBT periodicity before the first candidate resource is located before the boundary position of the transmission resource, and four 25 µs LBT periodicities and five candidate resources for transmitting a PRACH signal are precluded from the 1 ms sub-frame, so there are 3488*Ts remaining. Accordingly an idle periodicity is further configured between two adjacent candidate resources, and the length of each idle periodicity is 3488/4=872×Ts. As for the terminal, the terminal going to transmit a PRACH signal firstly performs LBT detection before the boundary position of the transmission resource, and if the current channel is accessible, then the terminal will transmit a PRACH signal immediately; and if the current channel is occupied, then the terminal will further perform LBT detection before the next candidate resource, and if the current channel is accessible, then the terminal will transmit a PRACH signal immediately; otherwise, the process above will be repeated until the current channel is accessible, and the terminal transmits a PRACH signal successfully.

This implementation is preferably applicable to the scenario where the base station does not schedule downlink or uplink transmission before the transmission resource.

In an implementation A2, the start position of the first candidate resource in the transmission resource is located after the boundary position of the transmission resource, that is, the start position of the first candidate resource in the transmission resource is located after the start position of the transmission resource.

Particularly if the base station schedules UL transmission before the transmission resource, and there may be no sufficient resource for LBT detection before the boundary position of the transmission resource, then the base station may configure LBT detection before the first candidate resource, after the boundary position of the transmission resource.

In this implementation, LBT detection before the first candidate resource in the transmission resource is configured at the boundary position of the transmission resource, that is, LBT detection is performed starting with the start position of the transmission resource.

Figure 3B:
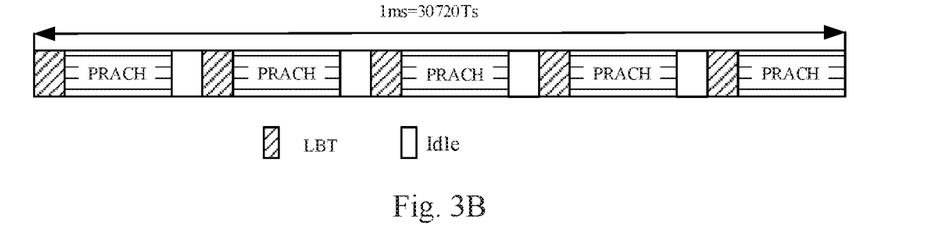
FIG. 3B is a second schematic diagram of configured transmission resources according to an embodiment of the invention.

By way of an example, still taking a PRACH signal in the format 4 as an example, as illustrated in FIG. 3B, an LBT periodicity before the first candidate resource is located within the boundary of the sub-frame, and five 25 µs LBT periodicities and five candidate resources for transmitting a PRACH signal are precluded from the 1 ms sub-frame, so there are 2720*Ts remaining. Accordingly an idle periodicity is further configured between two adjacent candidate resources, and the length of each idle periodicity is 2720/4=680×Ts.

This implementation is preferably applicable to the scenario where the base station schedules uplink transmission before the transmission resource.

In an implementation A3, the start position of the first candidate resource in the transmission resource is located before the boundary position of the transmission resource, that is, a part of information in a PRACH signal transmitted over the first candidate resource in the transmission resource is configured in the preceding sub-frame of the transmission resource.

Particularly if the base station schedules DL transmission before the transmission resource, then in order to prevent uplink and downlink crosstalk, there will be necessarily a guard period for downlink to uplink switching, between a previously scheduled DL sub-frame and the transmission resource, and if the guard period is exactly located before the boundary position of the transmission resource, then a part of a CP in a PRACH signal transmitted in the first candidate resource may be configured before the boundary position of the transmission resource, and the first candidate resource may end with a second UL symbol of the transmission resource.

In this implementation, LBT detection before the first candidate resource in the transmission resource is also performed in the preceding sub-frame of the transmission resource.

Figure 3C:
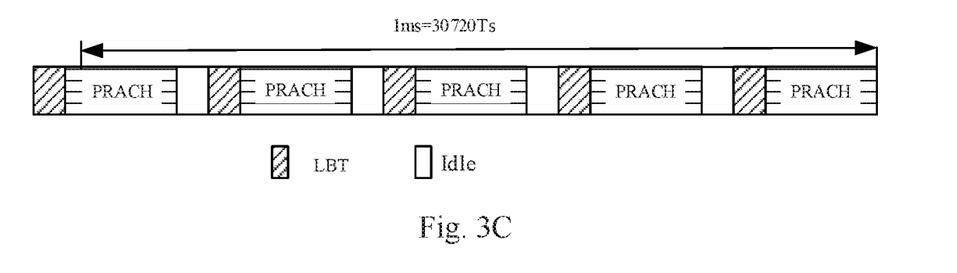
FIG. 3C is a third schematic diagram of configured transmission resources according to an embodiment of the invention.

By way of an example, still taking a PRACH signal in the format 4 as an example, as illustrated in FIG. 3C, the first candidate resource occupies only the first two UL symbols in the transmission resource, and four 25 µs LBT periodicities, four candidate resources for transmitting a PRACH signal, and the first two UL symbols occupied by the first candidate resource, i.e., 4400*Ts in total, are precluded from the 1 ms sub-frame, so there are 3920*Ts remaining. Accordingly an idle periodicity is further configured between two adjacent candidate resources, and the length of each idle periodicity is 3920/4=980×Ts.

This implementation is preferably applicable to the scenario where the base station schedules uplink transmission before the transmission resource.

In the implementation A1 to the implementation A3 above, the configuration information can be agreed on in advance between the terminal and the base station; or the configuration information can be determined by the base station, and then signaled to the terminal.

In an implementation B, the size of the transmission resource is less than a sub-frame, that is, the base station allocates for the terminal a partial sub-frame for transmitting a PRACH signal.

In this implementation, if a part of the transmission resources is used for DL transmission, then in order to avoid uplink and downlink crosstalk, there will be necessarily a guard period for downlink to uplink switching, after DL transmission, and if there is a sufficient resource after the guard period in the transmission resource, then a plurality of candidate resources may be configured in the transmission resource, where the start position of the first candidate resource in the transmission resource is located before the boundary position of the guard period, or the start position of the first candidate resource in the transmission resource is located at the boundary position of the guard period; the start position of the first candidate resource in the transmission resource is located after the boundary position of the guard period.

Figure 4:
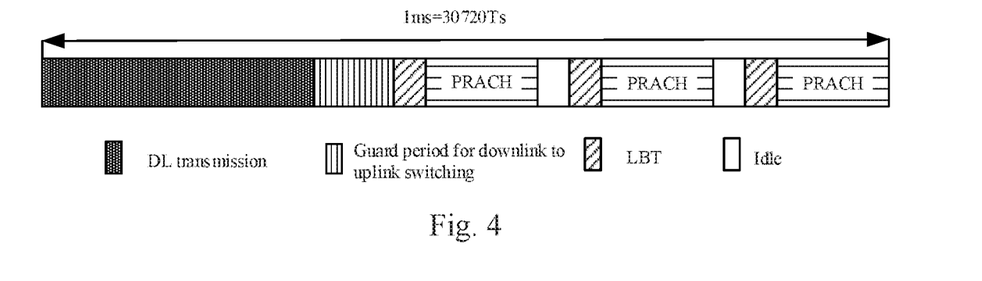
FIG. 4 is a fourth schematic diagram of configured transmission resources according to an embodiment of the invention.

By way of an example, still taking a PRACH signal in the format 4 as an example, as illustrated in FIG. 4, if DL transmission in the sub-frame including the transmission resource occupies five Orthogonal Frequency Division Multiplexing (OFDM) symbols, and the guard period for downlink to uplink switching occupies one OFDM symbol, then there will be remaining resources of 17552*Ts in the transmission resource, so three LBT periodicities and three candidate resources can be configured in the transmission resource, and as a result, there are 752*Ts remaining, where two idle periodicities can be configured.

In this implementation, the configuration of the candidate resources in the transmission resource according to the embodiment of the invention will not be limited to the three optional configuration implementations above, but may be other configuration implementations, as long as the base station and the terminal have the same understanding of the configuration of the candidate resources in the transmission resource.

In this implementation, since there is generally a variable period of time for scheduled UL/DL transmission, the configuration is preferably determined by the base station, and then signaled to the terminal in this implementation.

In an implementation C, the size of the transmission resource is greater than a sub-frame, that is, the base station allocates for the terminal a partial sub-frame and at least one full sub-frame for transmitting a PRACH signal.

In this implementation, the positions of candidate resources in the partial sub-frame allocated by the base station for the terminal can be as described in the implementation B; and the positions of candidate resources in the full sub-frame allocated by the base station for the terminal can be as described in the implementation A.

Figure 5:
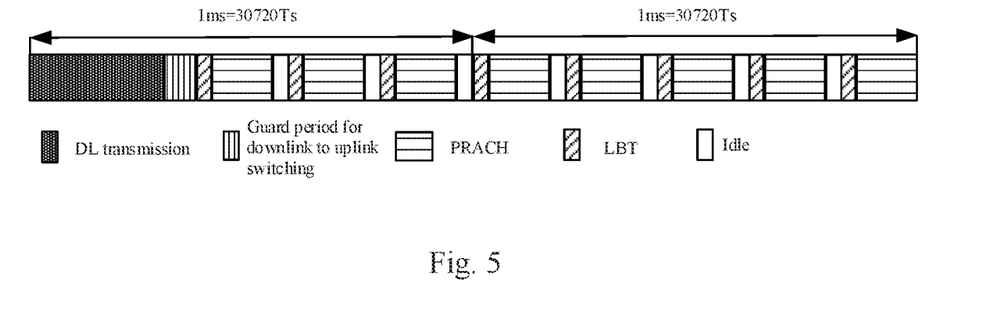
FIG. 5 is a fifth schematic diagram of configured transmission resources according to an embodiment of the invention.

By way of an example, still taking a PRACH signal in the format 4 as an example, as illustrated in FIG. 5, if DL transmission in the configured partial sub-frame occupies five OFDM symbols, and the guard period for downlink to uplink switching occupies one OFDM symbol, then three LBT periodicities, three candidate transmission positions for a PRACH signal, and three idle periodicities can be configured in the partial sub-frame in the transmission resource; and five LBT periodicities, five candidate resources, and four idle periodicities can be configured in the full sub-frame after the partial sub-frame.

In this implementation, since there is generally a variable period of time for UL/DL transmission scheduled in the partial sub-frame, the configuration information is preferably determined by the base station, and then signaled to the terminal in this implementation.

Figure 6:
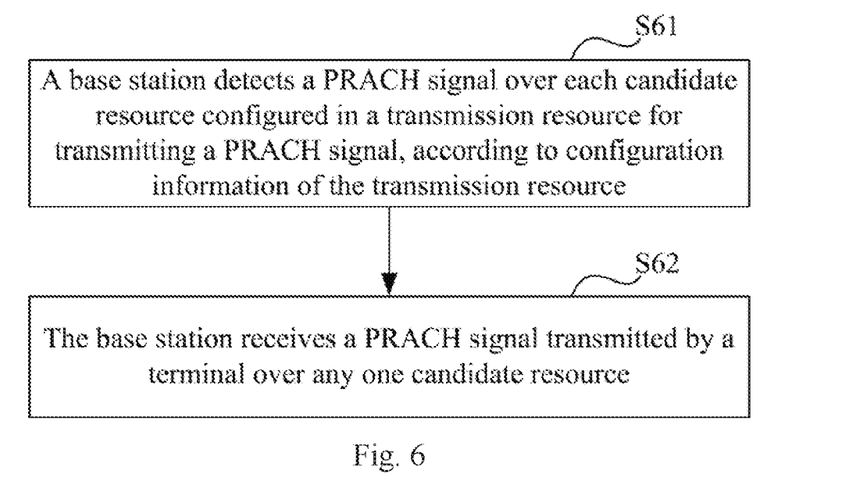
FIG. 6 is a schematic flow chart of a method for receiving a PRACH signal in an unauthorized spectrum according to an embodiment of the invention.

Based upon the same inventive idea, a second embodiment of the invention provides a method for receiving a Physical Random Access Channel (PRACH) signal in an unauthorized spectrum, and as illustrated in FIG. 6, the method includes followings.

S61. A base station detects a PRACH signal over each candidate resource configured in a transmission resource for transmitting a PRACH signal, according to configuration information of the transmission resource.

S62. The base station receives a PRACH signal transmitted by a terminal over any one candidate resource.

In the embodiment of the invention, a plurality of candidate resources are configured in a transmission resource for transmitting a PRACH signal so that the terminal can transmit a PRACH signal over a corresponding candidate resource upon detecting the current channel being idle, before any one candidate resource, thus improving the probability of transmitting a PRACH signal, and an access to a channel for a PRACH signal.

In this embodiment, reference can be made to the related description in the first embodiment for details of the configuration information of the transmission resource, and the positions of the candidate resources configured in the transmission resource, so a repeated description thereof will be omitted here.

The process flows of the methods above can be performed in software program, where the software program can be stored in a storage medium, and when the stored software program is invoked, it can perform the steps in the methods above.

Figure 7:
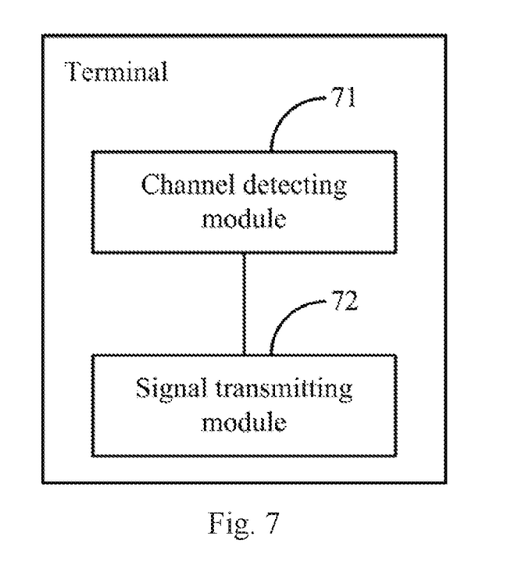
FIG. 7 is a schematic diagram of a first terminal according to an embodiment of the invention.

Based upon the same inventive idea, a third embodiment of the invention provides a terminal as illustrated in FIG. 7, which includes followings.

A channel detecting module 71 is configured to perform LBT detection before each candidate resource configured in a transmission resource for transmitting a PRACH signal, according to configuration information of the transmission resource until the current channel being idle is detected.

A signal transmitting module 72 is configured to transmit a PRACH signal over a corresponding candidate resource after the channel detecting module 107 detects the current channel being idle.

In this embodiment, reference can be made to the related description in the first embodiment for details of the configuration information of the transmission resource, and the positions of the candidate resources configured in the transmission resource, so a repeated description thereof will be omitted here.

Figure 8:
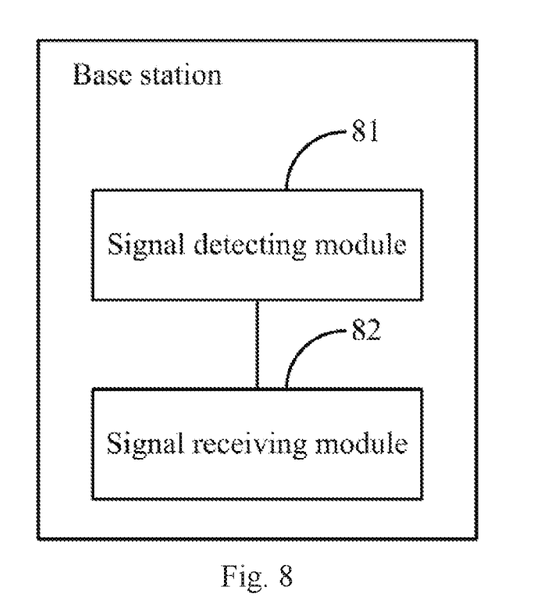
FIG. 8 is a schematic diagram of a first base station according to an embodiment of the invention.

Based upon the same inventive idea, a fourth embodiment of the invention provides a base station as illustrated in FIG. 8, which includes followings.

A signal detecting module 81 is configured to detect a PRACH signal over each candidate resource configured in a transmission resource for transmitting a PRACH signal, according to configuration information of the transmission resource.

A signal receiving module 82 is configured to receive a PRACH signal transmitted by a terminal over any one candidate resource.

In this embodiment, reference can be made to the related description in the first embodiment for details of the configuration information of the transmission resource, and the positions of the candidate resources configured in the transmission resource, so a repeated description thereof will be omitted here.

Figure 9:
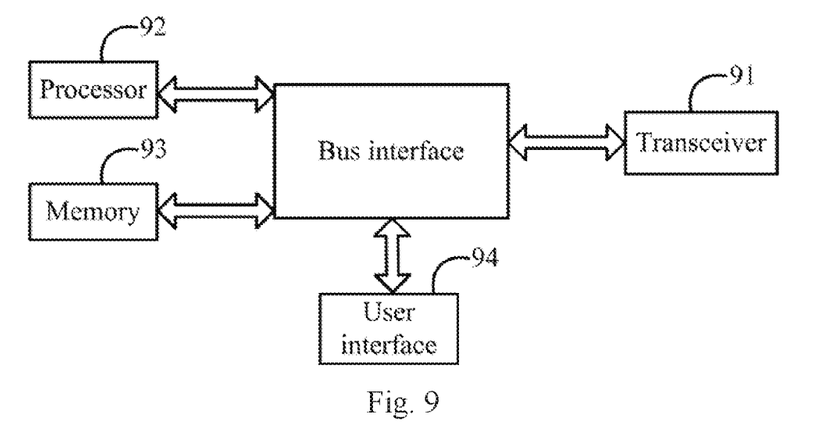
FIG. 9 is a schematic diagram of a second terminal according to an embodiment of the invention.

Based upon the same inventive idea, a fifth embodiment of the invention provides another terminal as illustrated in FIG. 9, which includes a transceiver 91, and at least one processor 92 connected with the transceiver 91.

The processor 92 is configured to read and execute program in a memory 93 to perform LBT detection before each candidate resource configured in a transmission resource for transmitting a PRACH signal, according to configuration information of the transmission resource until the current channel being idle is detected; and to control the transceiver 91 to transmit a PRACH signal over a corresponding candidate resource after the current channel being idle is detected.

The transceiver 91 is configured to receive and transmit data under the control of the processor 92.

Here in FIG. 9, the bus architecture can include any number of interconnecting buses and bridges to particularly link together various circuits including one or more processors represented by the processor 92, and one or more memories represented by the memory 93. The bus architecture can further link together various other circuits, e.g., a peripheral device, a manostat, a power management circuit, etc., all of which are well known in the art, so a further description thereof will be omitted in this context. The bus interface serves as an interface. The transceiver 91 can be a number of elements including a transmitter and a receiver, which are units for communication with various other devices over a transmission medium. For different user equipments, a user interface 94 can also be an interface via which desirable devices can be connected internally or externally, and the connected devices can include but will not be limited to a keypad, a display, a speaker, a microphone, a joystick, etc.

The processor 92 is responsible for managing the bus architecture and performing normal processes, and the memory 93 can store data for use by the processor 92 in performing the operations.

In this embodiment, reference can be made to the related description in the first embodiment for details of the configuration information of the transmission resource, and the positions of the candidate resources configured in the transmission resource, so a repeated description thereof will be omitted here.

Figure 10:
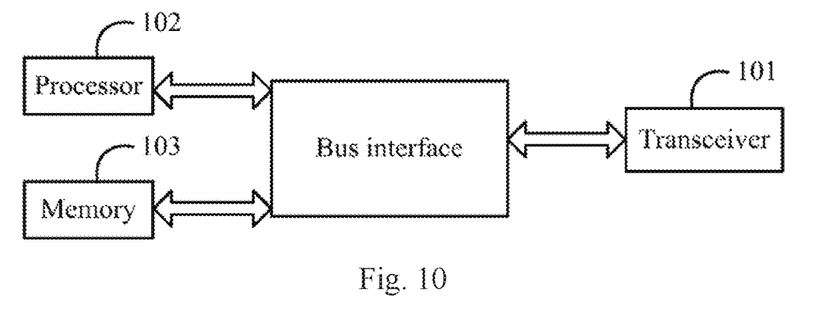
FIG. 10 is a schematic diagram of a second base station according to an embodiment of the invention.

Based upon the same inventive idea, a sixth embodiment of the invention provides another base station as illustrated in FIG. 10, which includes a transceiver 101, and at least one processor 102 connected with the transceiver 101.

The processor 102 is configured to read and execute program in a memory 103 to detect a PRACH signal over each candidate resource configured in a transmission resource for transmitting a PRACH signal, according to configuration information of the transmission resource; and to control the transceiver 101 to receive a PRACH signal transmitted by a terminal over any one candidate resource.

The transceiver 101 is configured to receive and transmit data under the control of the processor 102.

Here in FIG. 10, the bus architecture can include any number of interconnecting buses and bridges to particularly link together various circuits including one or more processors represented by the processor 102, and one or more memories represented by the memory 103. The bus architecture can further link together various other circuits, e.g., a peripheral device, a manostat, a power management circuit, etc., all of which are well known in the art, so a further description thereof will be omitted in this context. The bus interface serves as an interface. The transceiver 101 can be a number of elements including a transmitter and a receiver, which are units for communication with various other devices over a transmission medium. The processor 102 is responsible for managing the bus architecture and performing normal processes, and the memory 103 can store data for use by the processor 102 in performing the operations.

In this embodiment, reference can be made to the related description in the first embodiment for details of the configuration information of the transmission resource, and the positions of the candidate resources configured in the transmission resource, so a repeated description thereof will be omitted here.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting a Physical Random Access Channel (PRACH) signal in an unauthorized spectrum, the method comprising:

performing, by a terminal, Listen Before Talk (LBT) detection before each candidate resource configured in a transmission resource for transmitting a PRACH signal, according to configuration information of the transmission resource until a current channel being idle is detected; wherein at least two candidate resources are configured in the transmission resource for transmitting the PRACH signal; and transmitting, by the terminal, a PRACH signal over a corresponding candidate resource after the current channel being idle is detected.

2. The method according to claim 1, wherein the configuration information is agreed on in advance between the terminal and a base station; or the configuration information is determined by the base station, and then signaled to the terminal.

3. The method according to claim 1, wherein the configuration information comprises at least one of positional information of the candidate resources in the transmission resource, a quantity of candidate resources in the transmission resource, or positional information of LBT periodicities for performing LBT detection before the candidate resources in the transmission resource.

4. The method according to claim 1, wherein if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

5. The method according to claim 1, wherein if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

6. A method for receiving a Physical Random Access Channel (PRACH) signal in an unauthorized spectrum, the method comprising:
detecting, by a base station, a PRACH signal over each candidate resource configured in a transmission resource for transmitting a PRACH signal, according to configuration information of the transmission resource; wherein at least two candidate resources are configured in the transmission resource for transmitting the PRACH signal; and
receiving, by the base station a PRACH signal transmitted by a terminal over any candidate resource.

7. The method according to claim 6, wherein the configuration information is agreed on in advance between the terminal and a base station; or the configuration information is determined by the base station, and then signaled to the terminal.

8. The method according to claim 6, wherein the configuration information comprises at least one of positional information of the candidate resources in the transmission resource, a quantity of candidate resources in the transmission resource, or positional information of LBT periodicities for performing LBT detection before the candidate resources in the transmission resource.

9. The method according to claim 6, wherein if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

10. The method according to claim 6, wherein if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

11. A terminal, comprising: a transceiver, and at least one processor connected with the transceiver, wherein:
the processor is configured to read and execute program in a memory to:
perform Listen Before Talk (LBT) detection before each candidate resource configured in a transmission resource for transmitting a PRACH signal, according to configuration information of the transmission resource until a current channel being idle is detected; and control the transceiver to transmit a PRACH signal over a corresponding candidate resource after the current channel being idle is detected;
wherein at least two candidate resources are configured in the transmission resource for transmitting the PRACH signal; and
the transceiver is configured to receive and transmit data under a control of the processor.

12. The terminal according to claim 11, wherein the configuration information is agreed on in advance between the terminal and a base station; or the configuration information is determined by the base station, and then signaled to the terminal.

13. The terminal according to claim 11, wherein the configuration information comprises at least one of positional information of the candidate resources in the transmission resource, a quantity of candidate resources in the transmission resource, or positional information of LBT periodicities for performing LBT detection before the candidate resources in the transmission resource.

14. The terminal according to claim 11, wherein if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

15. The terminal according to claim 11, wherein if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

16. A base station, comprising: a transceiver, and at least one processor connected with the transceiver, wherein:
the processor is configured to read and execute program in a memory to:
detect a PRACH signal over each candidate resource configured in a transmission resource for transmitting a PRACH signal, according to configuration information of the transmission resource; and control the transceiver to receive a PRACH signal transmitted by a terminal over any candidate resource; wherein at least two candidate resources are configured in the transmission resource for transmitting the PRACH signal; and the transceiver is configured to receive and transmit data under a control of the processor.

17. The base station according to claim 16, wherein the configuration information is agreed on in advance between the terminal and a base station; or the configuration information is determined by the base station, and then signaled to the terminal.

18. The base station according to claim 16, wherein the configuration information comprises at least one of positional information of the candidate resources in the transmission resource, a quantity of candidate resources in the transmission resource, or positional information of LBT periodicities for performing LBT detection before the candidate resources in the transmission resource.

19. The base station according to claim 16, wherein if the transmission resource is a full sub-frame, then a start position of a first candidate resource in the transmission resource will be located before a boundary position of the full sub-frame, or a start position of a first candidate resource in the transmission resource will be located at a boundary position of the full sub-frame, or a start position of a first candidate resource in the transmission resource will be located after a boundary position of the full sub-frame.

20. The base station according to claim 16, wherein if the transmission resource is less than a sub-frame, then there will be further arranged a guard period for downlink to uplink switching, before the transmission resource, wherein a start position of a first candidate resource in the transmission resource is located before a boundary position of the guard period, or a start position of a first candidate resource in the transmission resource is located at a boundary position of the guard period, or a start position of a first candidate resource in the transmission resource is located after a boundary position of the guard period.

* * * * *